United States Patent [19]
Wheetley et al.

[11] Patent Number: 5,468,099
[45] Date of Patent: Nov. 21, 1995

[54] SEAM TRACKING DRILLING MACHINE

[75] Inventors: Michael J. Wheetley, Bedford; David A. Schaller, Dallas, both of Tex.

[73] Assignee: Vought Aircraft Company, Dallas, Tex.

[21] Appl. No.: 104,621

[22] Filed: Aug. 11, 1993

[51] Int. Cl.$^6$ ............................. B23B 35/00; B62D 57/02
[52] U.S. Cl. ........................... 408/1 R; 180/8.1; 180/8.6; 408/76; 408/88; 408/234
[58] Field of Search ..................... 408/1 R, 72 R, 408/76, 88, 234; 180/8.1, 8.5, 8.6, 8.7

[56] References Cited

U.S. PATENT DOCUMENTS

| | | |
|---|---|---|
| 2,546,957 | 3/1951 | Ray . |
| 4,108,566 | 8/1978 | Jones . |
| 4,345,658 | 8/1982 | Danel et al. . |
| 4,599,018 | 7/1986 | Woods ..................................... 408/76 |
| 4,613,262 | 9/1986 | Woods . |
| 4,637,494 | 1/1987 | Iida et al. . |
| 4,674,949 | 6/1987 | Kroczynski . |
| 4,738,583 | 4/1988 | Macconochie et al. . |
| 4,850,763 | 7/1989 | Jack et al. . |
| 4,865,140 | 9/1989 | Cottam . |
| 4,940,382 | 7/1990 | Castelain et al. . |
| 5,351,626 | 10/1994 | Yanagisawa ............................ 180/8.6 |

FOREIGN PATENT DOCUMENTS

| | | | |
|---|---|---|---|
| 1679 | 1/1987 | Japan ...................... 180/8.6 |
| 36587 | 2/1989 | Japan ...................... 180/8.6 |
| 418366 | 3/1974 | U.S.S.R. ................... 180/8.5 |

OTHER PUBLICATIONS

Seven-legged rover, Popular Science, Jun., 1989, p. 37.
Celesco Transducer Products, Inc., V-Scope, The Ultimate Measurement System.
Fortune Magazine, May 3, 1993, p. 93, A Robot Inspector for Airplanes, by Andrew Kupfer.

*Primary Examiner*—Daniel W. Howell
*Attorney, Agent, or Firm*—Richards, Medlock & Andrews

[57] ABSTRACT

A seam tracking robotic drilling machine (10) is disclosed which is capable of moving a drill head along the seam (12) between abutting skin panels (14, 16) to drill a plurality of precisely positioned holes (18) through the panel. The machine (10) includes a perimeter support frame (20) which mounts a platform (36) for rotation about an axis (38) generally perpendicular the panels to be drilled. The platform supports a carriage (48) for movement along an axis 50 parallel the surface of the panels and in the direction of the seam while the carriage (48) supports an inner carriage (62) for movement along axis 60 perpendicular thereto. A drill head (74) is mounted on the inner carriage (62). A series of variable height vacuum cup assemblies (22–28) support the perimeter support frame (20). A similar series of variable height vacuum cup assemblies (66–72) support the inner carriage (62). When one set of vacuum cup assemblies is activated for attachment to the panels, the other set is deactuated to allow the machine to walk along the seam.

15 Claims, 3 Drawing Sheets

SEAM TRACKING DRILLING MACHINE

TECHNICAL FIELD OF THE INVENTION

This invention relates to a device for automatically drilling holes, and in particular to a device which can track a seam between two mating surfaces and accurately drill holes through the surfaces near the seam.

BACKGROUND OF THE INVENTION

In the assembly of aircraft, it is common to attach a skin panel to a spar substructure near the edge of the skin panel. Typically, mating skin panels will be secured to the spar substructure at the seam between the panels.

In the past, the skin panels have been positioned in jigs on the spar substructure and holes drilled by hand at the seams to attached the skin panels to the spar substructure. Each hole must be drilled and then countersunk.

This is a time-consuming and expensive process. It is particularly complicated when the materials being drilled are in alignment fixtures and access is limited. A need therefore exists for an improved device and technique for drilling and countersinking these holes which improves the efficiency of the operation.

SUMMARY OF THE INVENTION

In accordance with one aspect of the present invention, a robotic carriage is provided for moving over a surface without the use of rails. The device includes a first carriage having a frame with a first plurality of selectively actuatable adhesion supports extending from the frame so as to support the frame with respect to the surface. A platform is positioned in the frame in a desired relationship to the surface. A first drive is provided for selectively rotating the platform with respect to the frame about a rotational axis. A second carriage is provided which is movably mounted in the platform for movement with respect to the platform. A second drive selectively provides relative movement between the second carriage and the platform. A third carriage is movably mounted in the second carriage for movement with respect to the second carriage. A second plurality of selectively actuatable adhesion supports extend from the third carriage so as to support the third carriage with respect to the surface. A third drive selectively provides relative movement between the third carriage and the second carriage. A controller is used to deactivate one of the first and second plurality of selectively actuatable adhesion supports while the other is actuated and/or actuating the third drive to effect relative movement between the third carriage and the second carriage to thereby reposition one of the first and third carriages with respect to the other.

In accordance with another aspect of the present invention, a sensor is provided for sensing the orientation of the third carriage with respect to a desired line of travel. The controller actuates the first and second drives for positioning the third carriage in a desired orientation with respect to the desired line of travel.

In accordance with another aspect of the present invention, the device further includes a drill spindle unit mounted on the third carriage. The controller actuates the drill spindle unit to drill holes in the surface at predetermined positions located generally along the desired line of travel.

BRIEF DESCRIPTION OF THE DRAWINGS

For a more complete understanding of the present invention and the advantages thereof, references is now made to the following Detailed Description taken in conjunction with the accompanying drawings, in which.

DETAILED DESCRIPTION

Figure 1:
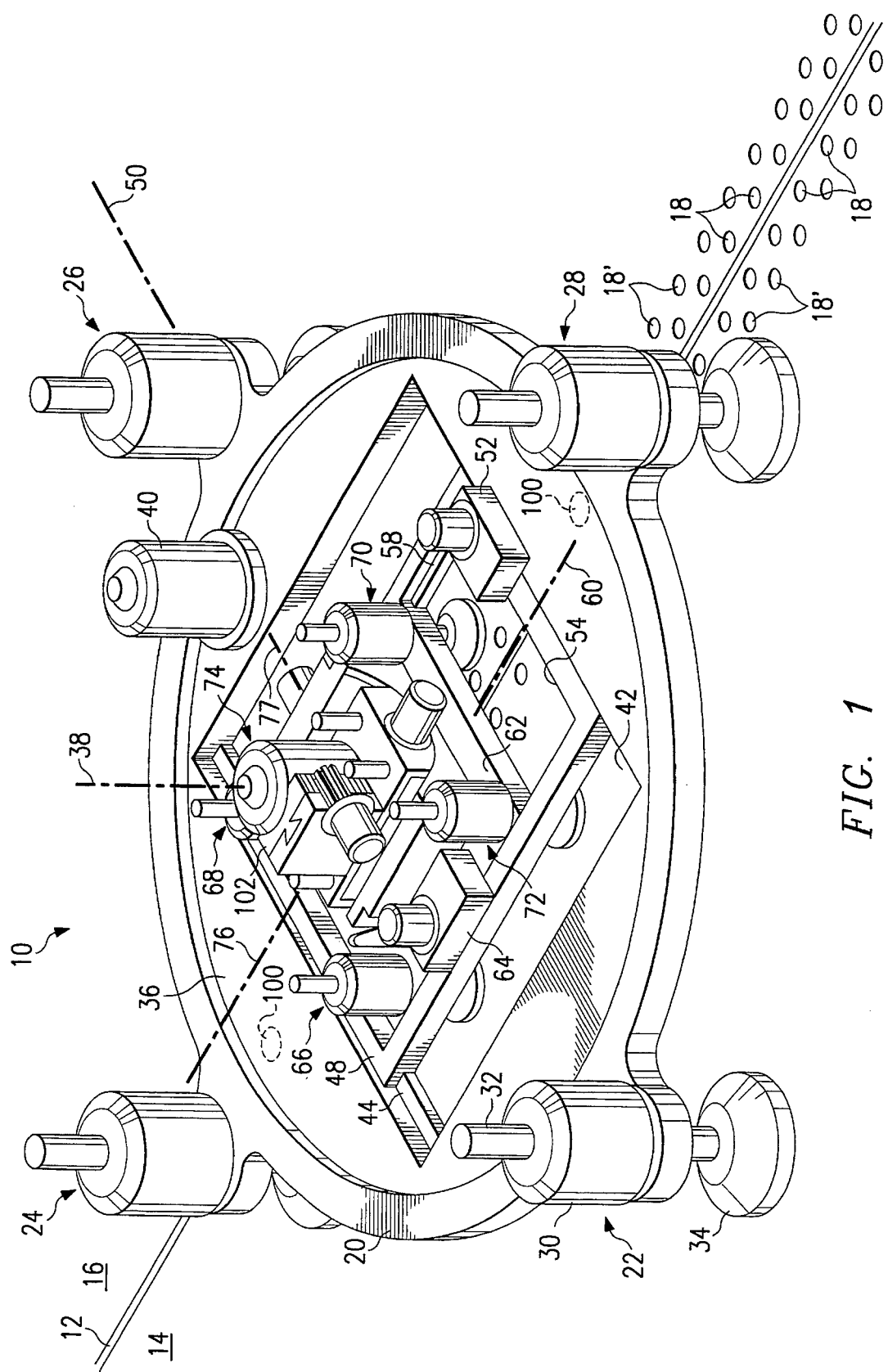
FIG. 1 is a perspective view of a robotic carriage forming a first embodiment of the present invention.

With respect now to the accompanying drawings, wherein like reference numerals designate like or similar parts throughout the several views, the seam tracking robotic drilling machine 10 is illustrated. As will be described in greater detail, the machine will move along a seam 12 separating abutting panels 14 and 16. As the machine moves along the seam, the machine will drill and countersink holes 18 in each of the panels at the seam. Multiple rows of holes 18 and 18' can be drilled by the machine.

With reference to FIG. 1, the machine 10 can be seen to include a perimeter support frame 20 which is supported on the surface by four variable height vacuum cup assemblies 22, 24, 26 and 28. Each cup assembly has a servomotor 30 which can move leg 32 up or down. At the lower end of each of the legs is a vacuum cup 34 in contact with the surface of the panels. A vacuum can be drawn within the cup to hold the cup on the surface of the panels and thereby secure the machine to the panels.

A platform 36 is mounted on the frame 20 for rotation about a vertical axis 38. A motor 40 mounted on the platform 36 is operated to rotate the platform 36 relative to frame 20. The inner periphery of the frame 20 can have teeth and the motor 40 can mount a gear engaging these teeth. Alternatively, the motor can have a rubberized friction wheel which engages the inner periphery of the frame 20. Other drive mechanisms are clearly possible.

A large square aperture 42 is formed in the middle of the platform 36. Along opposed sides of the aperture are rails 44 and 46 (not shown) which support a middle carriage 48. The middle carriage 48 rests on the rails 44 and 46 so that the carriage can move along an axis 50 which parallels the rails 44 and 46. A motor 52 is mounted on a carriage 48 which moves the carriage 48 in either direction along the axis 50 relative to the platform 36. The carriage 48 has a square aperture 54 formed in the middle thereof and defines parallel rails 56 (not shown) and 58 which extend along an axis 60 which is perpendicular to the axis 50.

An inner carriage 62 is mounted on the rails 56 and 58 for movement along the axis 60. A motor 64 is mounted on the inner carriage which drives the inner carriage 62 in either direction selected along axis 60 relative to the carriage 48.

The inner carriage 62 mounts four variable height vacuum cup assemblies 66, 68, 70 and 72 substantially identical to assemblies 22–28. In the center of the inner carriage 62 is mounted a drill head 74 which is mounted for pivotal motion about at least an axis 76 and also preferably about a second, normal axis 77. The drill head has a drill spindle for drilling the holes 18 and a countersink for countersinking the holes. The drill head can mount sensors to detect a position perpendicular to the surface of the panels 14 and 16 at the point of drilling to insure that the drill begins cutting perpendicular or normal to the surface.

As can be visualized from the drawings and description above, the seam tracking drilling machine 10 is capable of automated movement along the seam between the skin panels 14 and 16 to drill the holes 18 through each panel at the seam. The machine is moved along the seam by securing the vacuum cup assemblies 22–28 of the support frame 20 to the panels and moving the inner carriage 62 along axis 60 in the direction of movement of the machine with vacuum cup assemblies 66–72 raised and deactivated. The vacuum cup assemblies 66–72 are then lowered to touch panels 14 and 16 and activated to secure the inner carriage 62 to the panels. The vacuum is then released in the cups 34 of the vacuum cup assemblies 22–28 and the cups lifted off the panels. The motor 64 is then operated in reverse to essentially pull the frame 20, carriage 48 and platform 36 in the direction of movement of the machine as well. This effectively allows the machine to walk forward along the seam between the panels. Other adhesion assemblies can be substituted for the vacuum cup assemblies, such as electromagnetic assemblies. Also, assemblies with simple friction engagement with the panels could be used if the frictional engagement is sufficient to insure proper operation of the machine.

If the seam is curved, or the machine begins to drift from alignment along the seam, the machine will realign itself by various movements of the platform 36 relative to the frame 20, movement of the carriage 48 relative to the platform 36 and movement of the inner carriage 62 relative to the carriage 48. These actions can all be automated with various sensors 100 to sense the seam location and a microprocessor 102 to control the movement. Normally, it will be desired to keep the axis 60 generally parallel to the seam and, if possible, directly over the seam. As each vacuum cup assembly is released from a vacuum engagement with the panels, the legs 32 are moved upwardly to lift the vacuum cup off the panel surface so that the assemblies will not interfere with the movement of the platform or carriage to which they are secured. The height of the machine 10 above the panels can also be adjusted by elevating or lowering the legs of the various vacuum cup assemblies.

Figure 2:
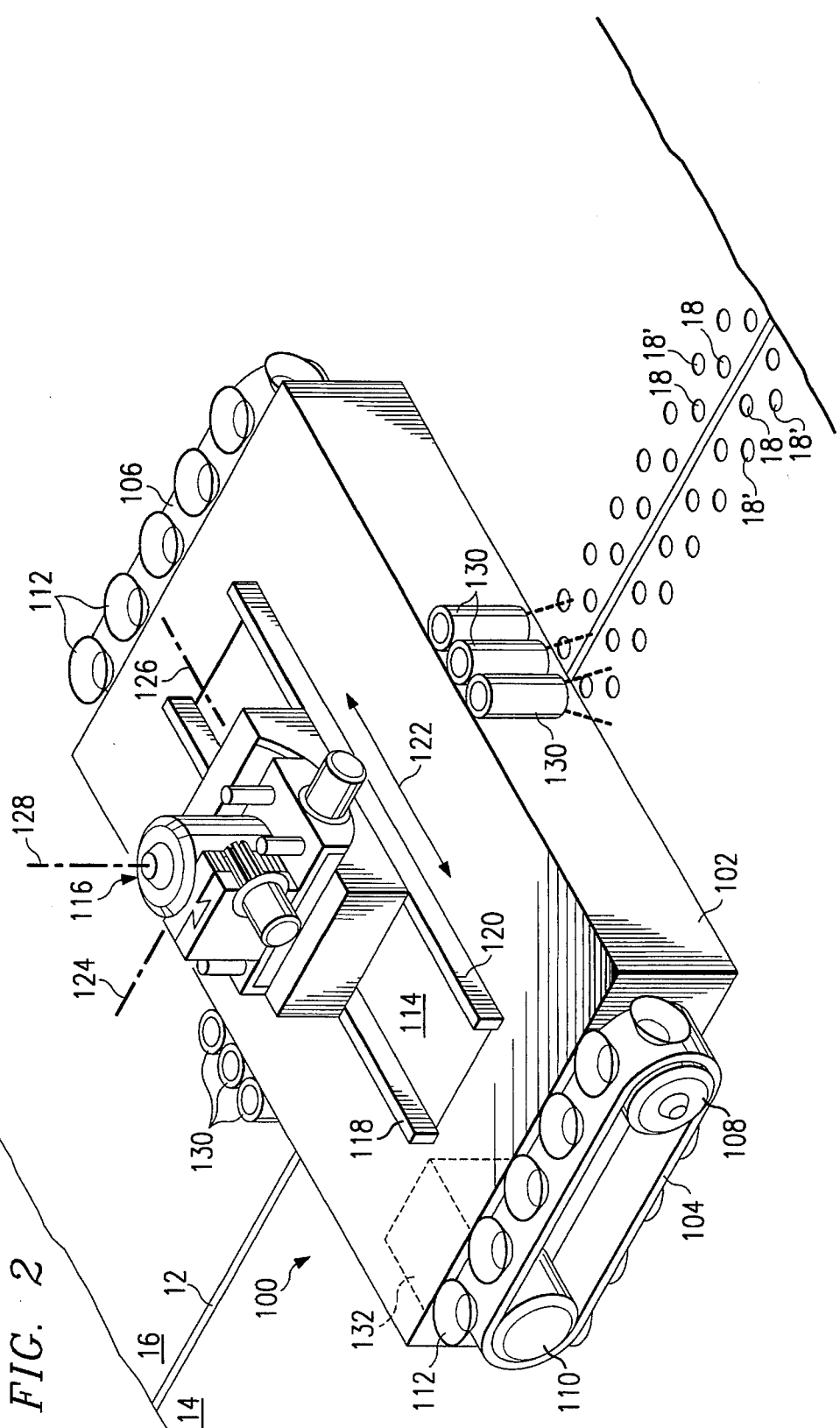
FIG. 2 is a perspective view of a tracked or wheeled robotic carriage forming a second embodiment of the present invention.

With reference now to FIG. 2, a machine 100 forming a second embodiment of the present invention is illustrated. The machine has a frame 102 which mounts a first drive belt 104 on one side of the frame and a second drive belt 106 on the opposite side of the frame. Each drive belt is supported on the frame by a drive wheel 108 and an idler wheel 110. The drive wheel is rotated by a belt drive motor inside the frame which is reversible and operable independent of the motor driving the other drive belt. Each of the driven belts has a series of adhesion devices 112 such as vacuum cups which adhere to the panels 14 and 16 to be drilled. Only the adhesion devices in actual contact with the panels are activated. The machine 100 can thus move forward or in reverse by rotating both drive belts in the same direction at the same speed. The machine can be rotated to follow a curving seam 12 by driving the belts at different speeds, or even with one drive belt halted or moving in the reverse direction.

An aperture 114 is formed in the frame which receives a drill head 116. The drill head slides along rails 118 and 120 on opposite sides of the aperture for lateral movement along an axis 122. As illustrated, the lateral motion will permit multiple rows of holes to be drilled along the seam by simply advancing the machine along the seam and moving the drill head laterally to the proper position.

The drill head 116, as drill head 74, can move along normal axes 124 and 126 and along vertical axis 128 to normalize the drill bit perpendicular to the surface of the panel being drilled. The drill head will have suitable sensors to adjust the drill head position for normalizing and depth control of the drilling and counterboring steps.

A plurality of seam tracking sensors 130 are positioned on the frame on opposite sides to monitor the position of the seam.

With machine 100, it is possible to direct the machine along the seam for drilling and counterboring even if the seam 12 curves across its length. A controller 132 is mounted in frame 102 to control the movement of the machine, including control of the drive belts, activation of the adhesion devices 112, control of the drill head 116 and movement of the drill head along axis 122. The controller 132 acts in response to the position of seam 12 detected by sensors 130, and other sensors used on the machine, such as sensors to detect when the drill head is normal the surface to be drilled. It will also be understood that the drill head need not be mounted on rails for movement with axis 122. The drive belts 104 and 106 can move the machine 100 in any direction desired.

Figure 3:
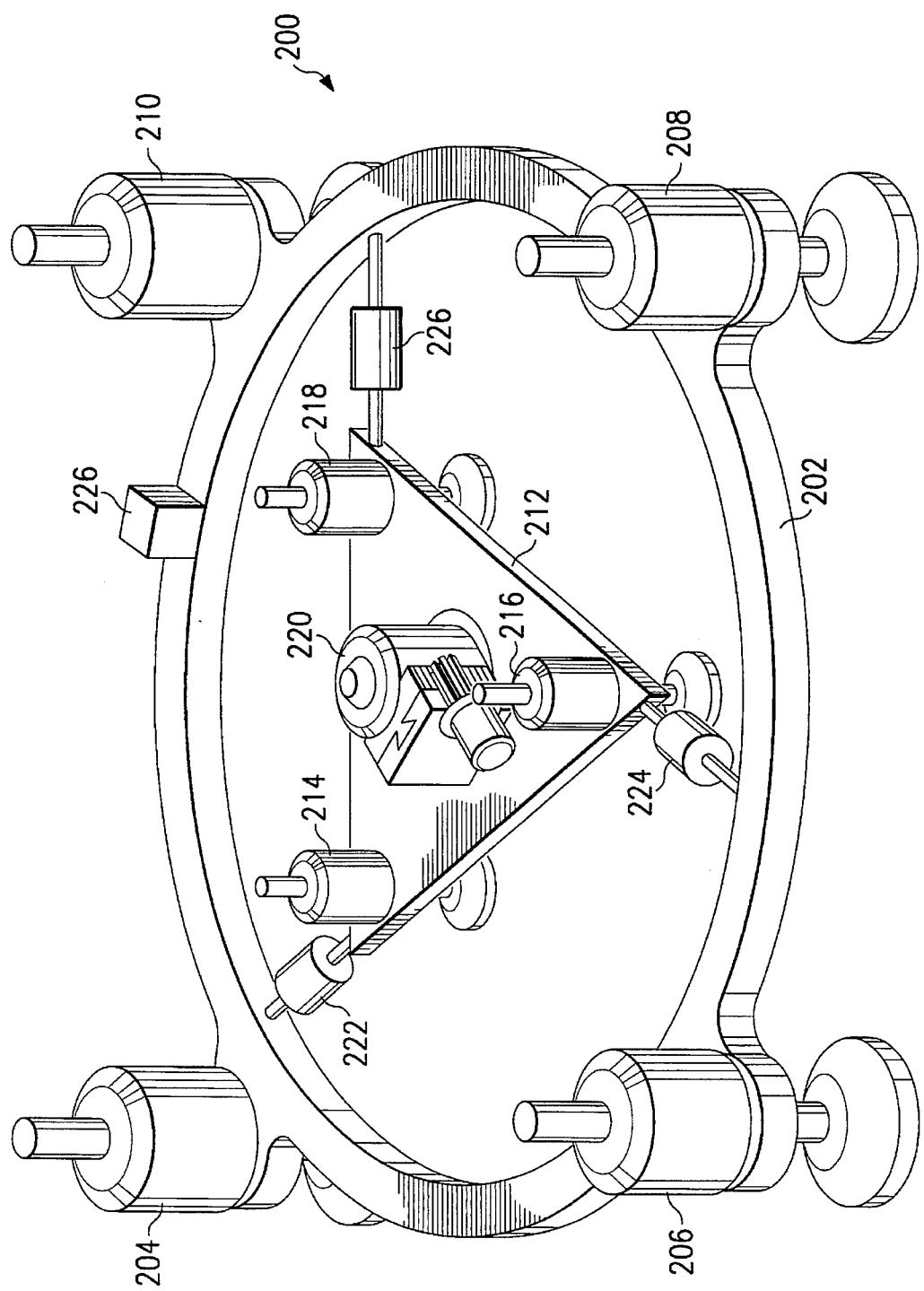
FIG. 3 is a perspective view of a robotic carriage forming a third embodiment of the present invention.

With reference now to FIG. 3, a third embodiment of the present invention, machine 200, is illustrated. The machine has a perimeter support frame 202 which mounts four variable height vacuum cup assemblies 204, 206, 208 and 210.

An inner platform 212 is supported on the surface being drilled by variable height vacuum cup assemblies 214, 216 and 218. A drill head 220 is rigidly mounted on the platform 212. Adjustable length actuators 222, 224 and 226 interconnect the frame 202 and the corners of the triangular shaped inner platform 212.

In machine 200, the normalization of the drill bit in the drill head and the control of the drilling depth is achieved by adjustment of the variable height vacuum cups 214, 216 and 218. For example, the inner platform 212 can be tilted to normalize the bit against the surface being drilled by shortening the vacuum cup assembly 214 and lengthening the vacuum cup assemblies 216 and 218. The adjustable length actuators will adjust in length to permit this motion to occur while still connecting the inner platform 212 to the support frame 202. Therefore, pivotal motion of a drill head about axes 76 and 77, or 124 and 126, is therefore not necessary.

To move the machine 200 along the panels, the motion is quite similar to that of machine 10. The vacuum cup assemblies 204, 206, 208 and 210 can be activated to hold the support frame 202 in place while the adjustable length actuators 222, 224 and 226 are activated to move the inner platform 212 in a particular direction. It will be understood that the actuators can adjust the inner platform in any direction relative to the support frame 202 within a predetermined range, including rotation relative to the support frame. Once the inner platform 212 is in the desired position, the variable height vacuum cup assemblies 214, 216 and 218 can be activated to secure the inner platform 212 to the panels. The vacuum cup assemblies 204, 206, 208 and 210 can then be deactivated and the adjustable length actuators 222, 224 and 226 activated to move the support frame 202 back to the original configuration relative to the inner platform 212. Again, the motion can be controlled by a controller 226 which controls the vacuum cup assemblies, adjustable length actuators and drill head to drill and/or countersink a hole in the surface. Typically some type of sensors, such as sensors 130, will be mounted on the machine 200 and connected to controller 226 to sense the position of the seam or other path on the surface being drilled.

Although several embodiments of the invention have been illustrated in the accompanying drawings and described in the foregoing detailed description, it will be understood that the invention is not limited to the embodiments disclosed, but is capable of numerous rearrangements, modification and substitutions of parts and elements without departing from the scope and spirit of the invention.

We claim:

1. A robotic carriage for moving along a predetermined path over a surface without the use of rails, comprising:

an inner member;

an outer member;

an intermediate member;

a plurality of selectively actuatable supports actuatable from an actuated state adhering to a surface and a de-actuated state released from the surface;

at least a first one of said selectively actuatable supports mounted on said outer member;

a first actuator connected between the outer member and the intermediate member for moving the members relative to each other, the robotic carriage further comprising a second actuator mounted between the intermediate member and the inner member for moving the inner member and intermediate member relative each other; and a controller for actuating said first one of said selectively actuatable supports and moving the inner member relative to the first one of said selectively actuatable supports to reposition the inner member on the surface, and subsequently de-actuating the first one of said selectively actuatable supports and moving said outer member and said first one of said selectively actuatable supports relative to the inner member.

2. A robotic carriage for moving along a predetermined path over a surface without the use of rails, comprising:

a platform;

a plurality of selectively actuatable supports mounted on said platform actuatable from an actuated state adhering to a surface and a de-actuated state released from a surface;

at least a first one of said selectively actuatable supports moveable relative to the platform;

a controller for actuating said first one of said selectively actuatable supports and moving the platform relative to the first one of said selectively actuatable supports to reposition the platform on the surface, and subsequently de-actuating said first one of said selectively actuatable supports and moving said first one of said selectively actuatable supports relative to the platform; and a drill head mounted on said platform for drilling a hole through the surface.

3. A robotic carriage for moving over a surface without the use of rails, comprising:

a first carriage having a frame, a first plurality of selectively actuatable supports extending from said frame so as to support said frame with respect to said surface, a platform positioned in said frame so as to be in a desired relationship to said surface, a first drive for selectively rotating said platform with respect to said frame about a rotational axis;

a second carriage movably mounted to said platform for movement with respect to said platform, a second drive for selectively providing relative movement between said second carriage and said platform;

a third carriage movably mounted to said second carriage for movement with respect to said second carriage, a second plurality of selected actuatable supports extending from said third carriage so as to support said third carriage with respect to said surface, and a third drive for selectively providing relative movement between said third carriage and said second carriage; and a controller for deactuating one of said first and second plurality of selectively actuatable supports while the other of said first and second plurality of selectively actuatable supports is actuated and for actuating said third drive to effect relative movement between said third carriage and said second carriage to thereby reposition one of said first and third carriages with respect to the other of said first and third carriages while the plurality of selectively actuatable supports on the carriage being repositioned are deactuated.

4. The robotic carriage in accordance with claim 3 further comprising a sensor for sensing the orientation of said third carriage with respect to a desired line of travel, and a controller for actuating said first and second drives for positioning said third carriage in the desired orientation with respect to said desired line of travel.

5. A robotic carriage in accordance with claim 4 further comprising a drill spindle unit mounted on said third carriage and a controller for actuating said drill spindle unit to drill holes in said surface at predetermined positions located generally along said desired line of travel.

6. A robotic carriage in accordance with claim 5 wherein said drill spindle unit is mounted on said third carriage by a gimbal, and further comprising means for adjusting the position of said gimbal along first and second axes.

7. A robotic carriage in accordance with claim 3 further comprising a sensor for determining the distance or angular orientation between said third carriage and the surface and for adjusting the height of at least one of the first plurality of selectively actuatable supports so as to adjust the distance between said third carriage and said surface.

8. A robotic carriage for moving over a surface without the use of rails for drilling holes through the surface, comprising:

a first carriage having a frame, a first plurality of selectively actuatable supports extending from the frame to support the frame on the surface, a platform positioned on the frame for pivotal motion relative to the frame about a first axis, and a first drive for selectively pivoting the platform with respect to the frame about the first axis;

a second carriage mounted to said platform for movement with respect to said platform along a second axis, the second axis being perpendicular to the first axis, a second drive for selectively moving the second carriage relative to the platform;

a third carriage mounted to the second carriage for movement with respect to the second carriage along a third axis, the third axis being perpendicular to both the first and second axes, a second plurality of selectively actuatable supports extending from said third carriage to support the third carriage on the surface and a third drive for selectively moving the third carriage relative to the second carriage along the third axis;

a controller for deactuating one of said first and second plurality of selectively actuatable supports while the other of said first and second plurality of selectively actuatable supports is actuated and for actuating said third drive to effect relative movement between said third carriage and said second carriage to thereby reposition one of said first and third carriages with respect to the other of said first and third carriages while the plurality of selectively actuatable supports on the carriage being repositioned are deactuated; and a drill spindle unit mounted on one of said carriages for drilling holes in the surface.

9. The robotic carriage of claim 8 wherein each of said plurality of selectively actuatable supports include a vacuum cup for vacuum attachment to the surface.

10. The robotic carriage of claim 8 wherein the drill spindle unit is mounted on the third carriage by a gimbal, and further comprises means for adjusting the position of the gimbal along first and second axes.

11. The robotic carriage of claim 8 wherein the platform has an aperture therein and first and second rails on opposite sides of the aperture, the second carriage supported by and moving along said first and second rails.

12. The robotic carriage of claim 8 wherein the second carriage has an aperture therethrough and first and second rails formed on opposite sides of the aperture, said third carriage being supported on and guided by the first and second rails.

13. A method for moving a robotic carriage over a surface without the use of rails, comprising:

actuating a first plurality of selectively actuatable supports extending from a first carriage to support the first carriage on the surface, the first carriage having a frame, a platform positioned in the frame and a first drive for selectively rotating the platform with respect to the frame about a rotational axis;

deactuating a second plurality of selectively actuatable supports extending from a third carriage, the third carriage movable relative to a second carriage, the second carriage movable relative to the first carriage;

selectively moving the second or third carriage relative to the first carriage;

actuating the second plurality of selectively actuatable supports to support the third carriage on the surface and deactuating the first plurality of selectively actuatable supports to remove support of the first carriage from the surface; and selectively moving the first or second carriage relative to the third carriage.

14. The method of claim 13 comprising the step of drilling a hole through the surface at a predetermined location with a drill mounted on one of the carriages.

15. The method of claim 13 further comprising the step of actuating the selectively actuatable supports by drawing a vacuum in a vacuum cup associated with each support to adhere the support to the surface.

* * * * *